W. F. BRADBURY, DEC'D.
E. BRADBURY, ADMINISTRATRIX.
ORE SEPARATOR.
APPLICATION FILED OCT. 31, 1910.
1,042,194.
Patented Oct. 22, 1912.
7 SHEETS—SHEET 1.
Fig. I.
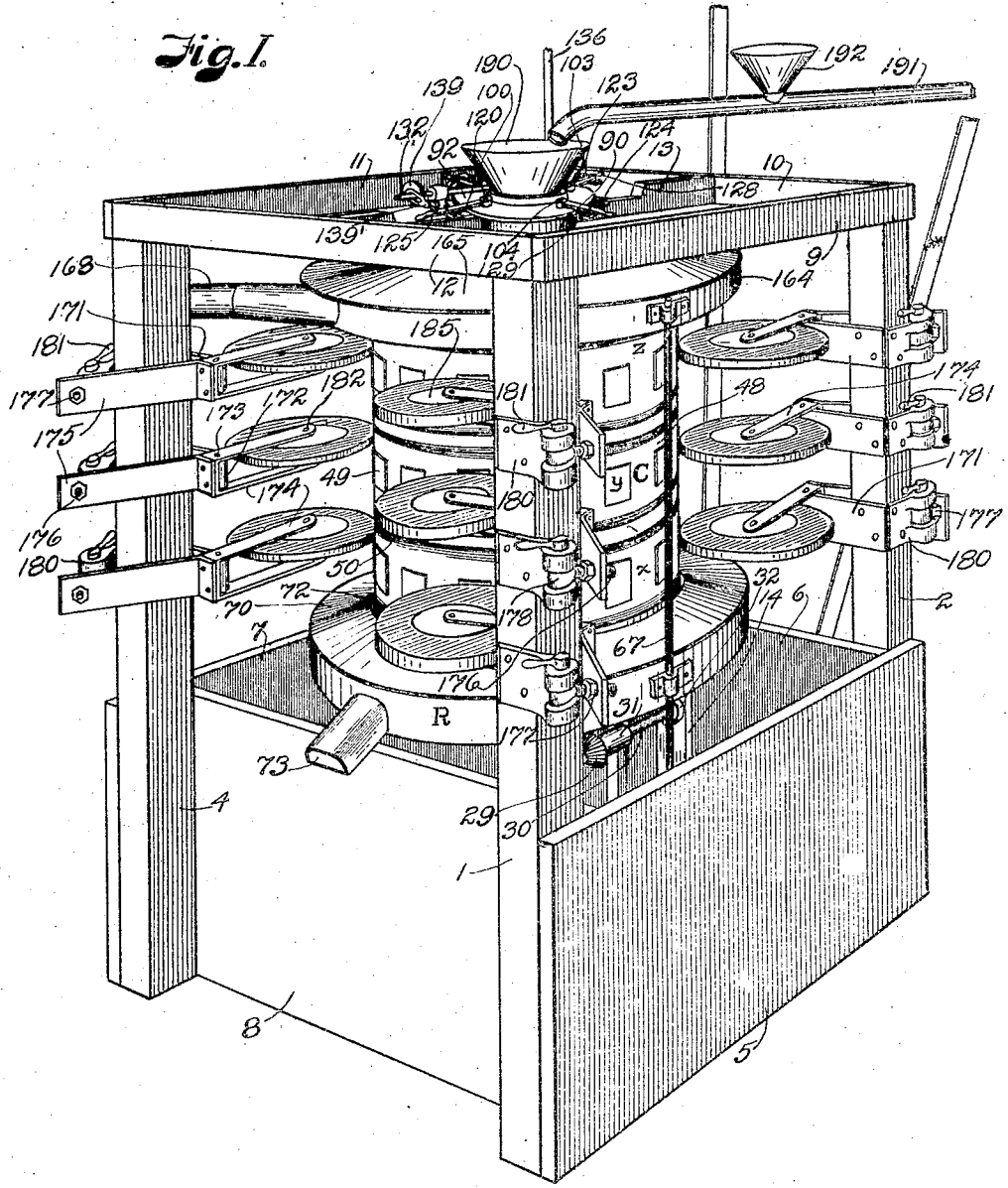
WITNESSES:
Arthur U. Capps.
Myrtle M. Jackson.
INVENTOR.
W. F. Bradbury.
BY
Arthur C. Brown
ATTORNEY.

W. F. BRADBURY, DEC'D.
E. BRADBURY, ADMINISTRATRIX.
ORE SEPARATOR.
APPLICATION FILED OCT. 31, 1910.
1,042,194.
Patented Oct. 22, 1912.
7 SHEETS—SHEET 2.
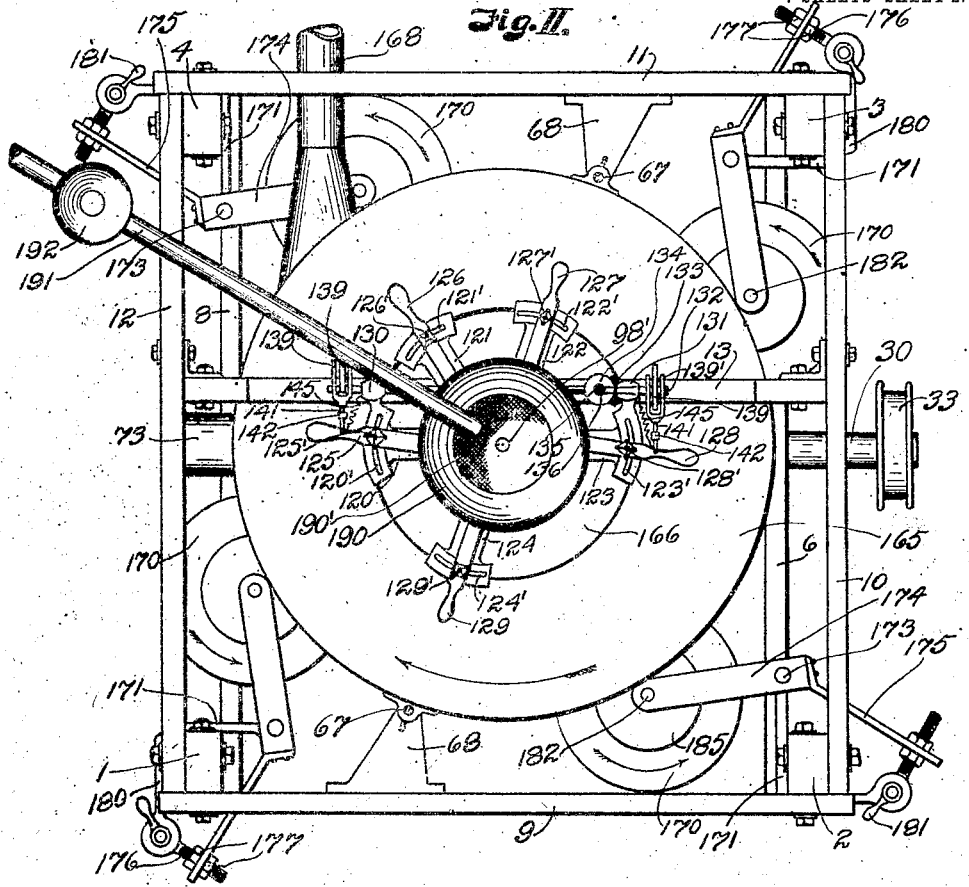
Fig. II.
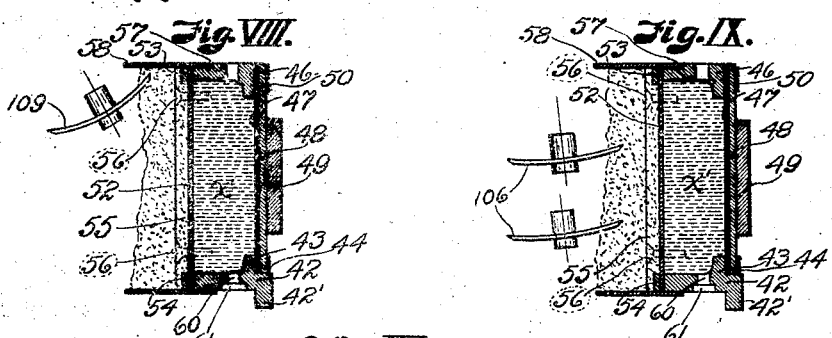
Fig. VIII.   Fig. IX.
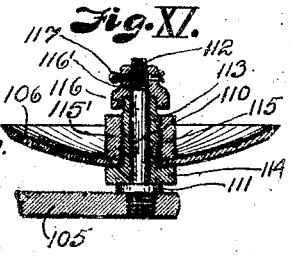
Fig. XI.
WITNESSES:
Arthur M. Caps.
Myrtle M. Jackson.
INVENTOR.
W. F. Bradbury.
BY
Arthur C. Brown
ATTORNEY.

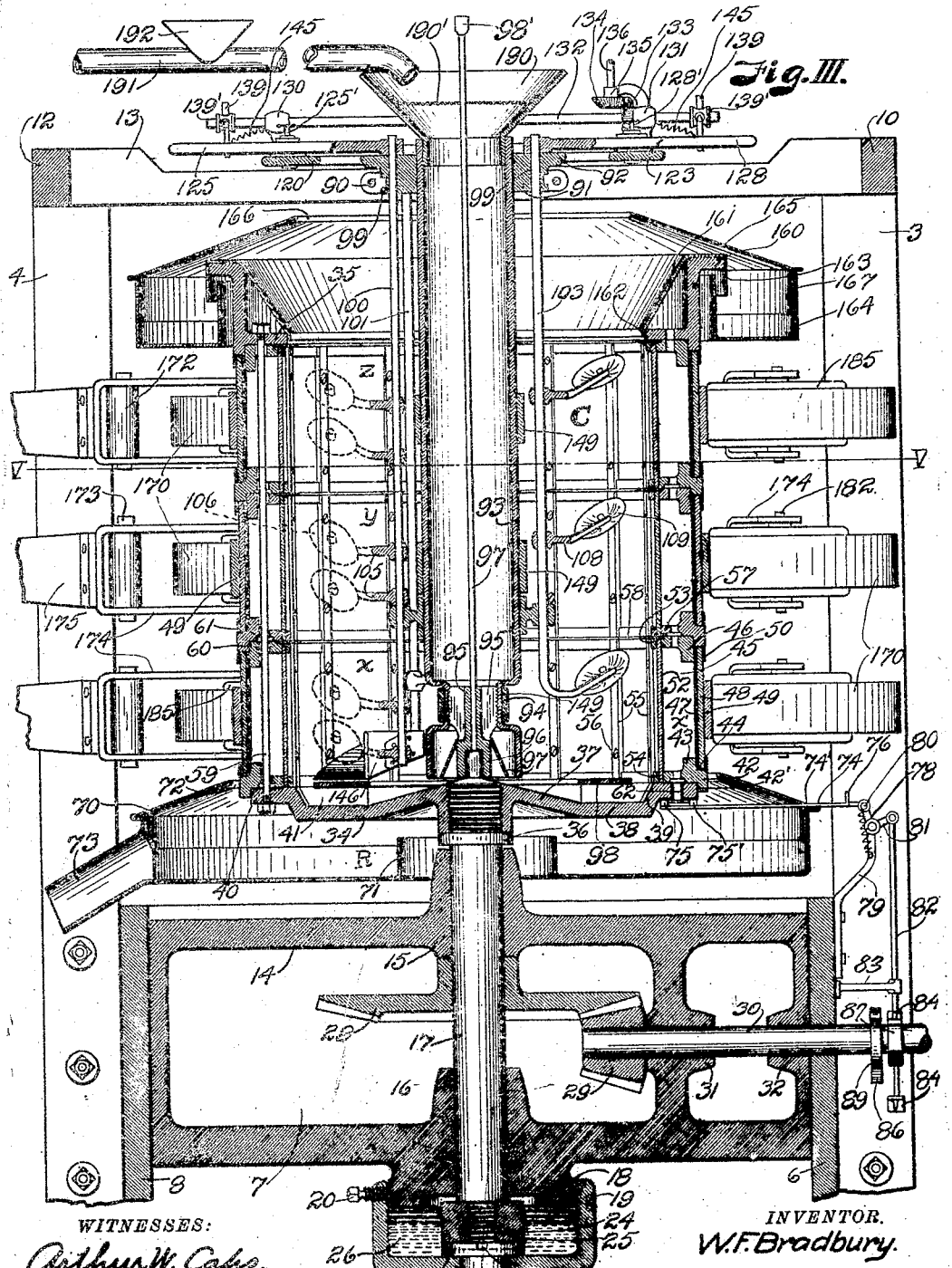

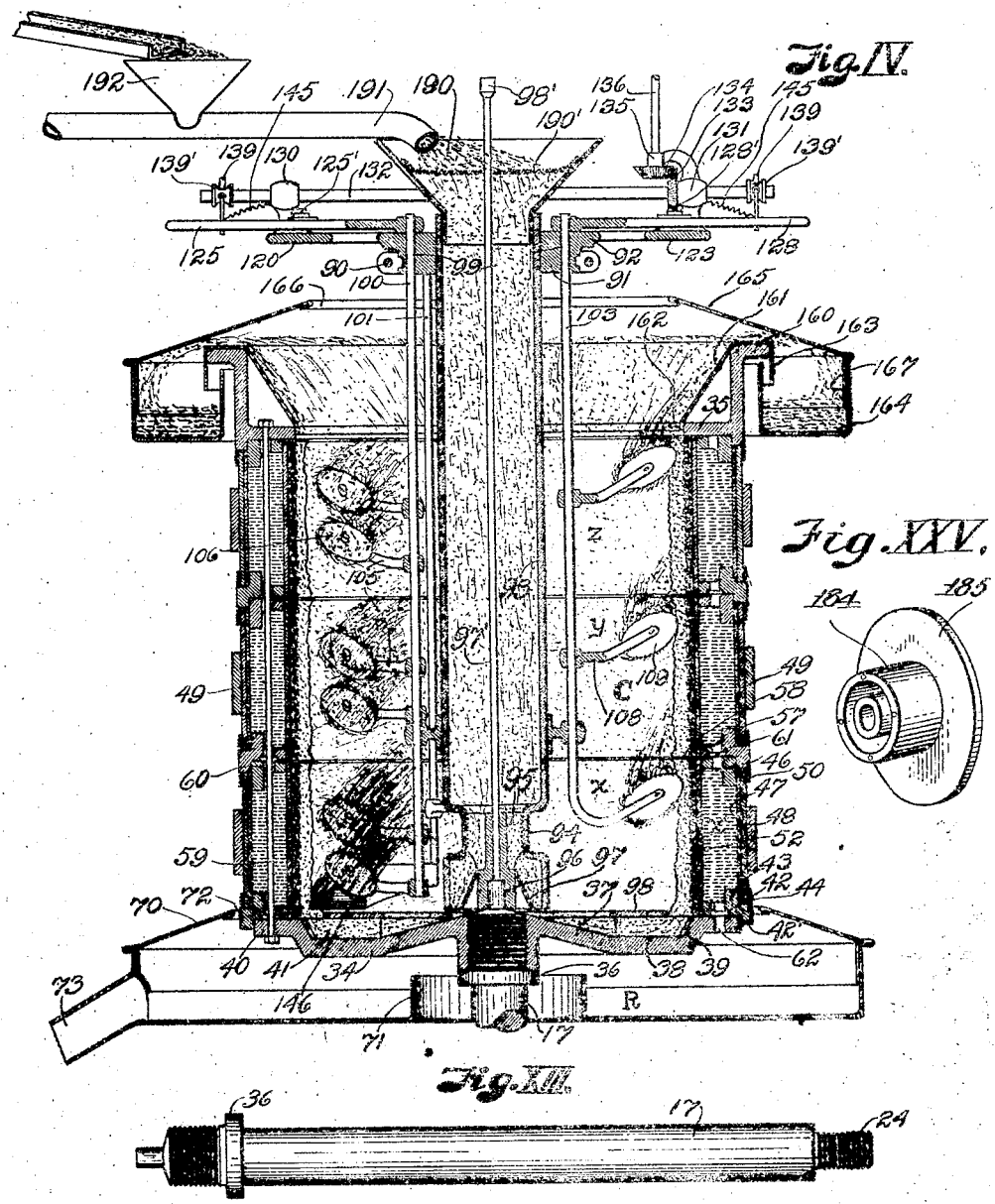

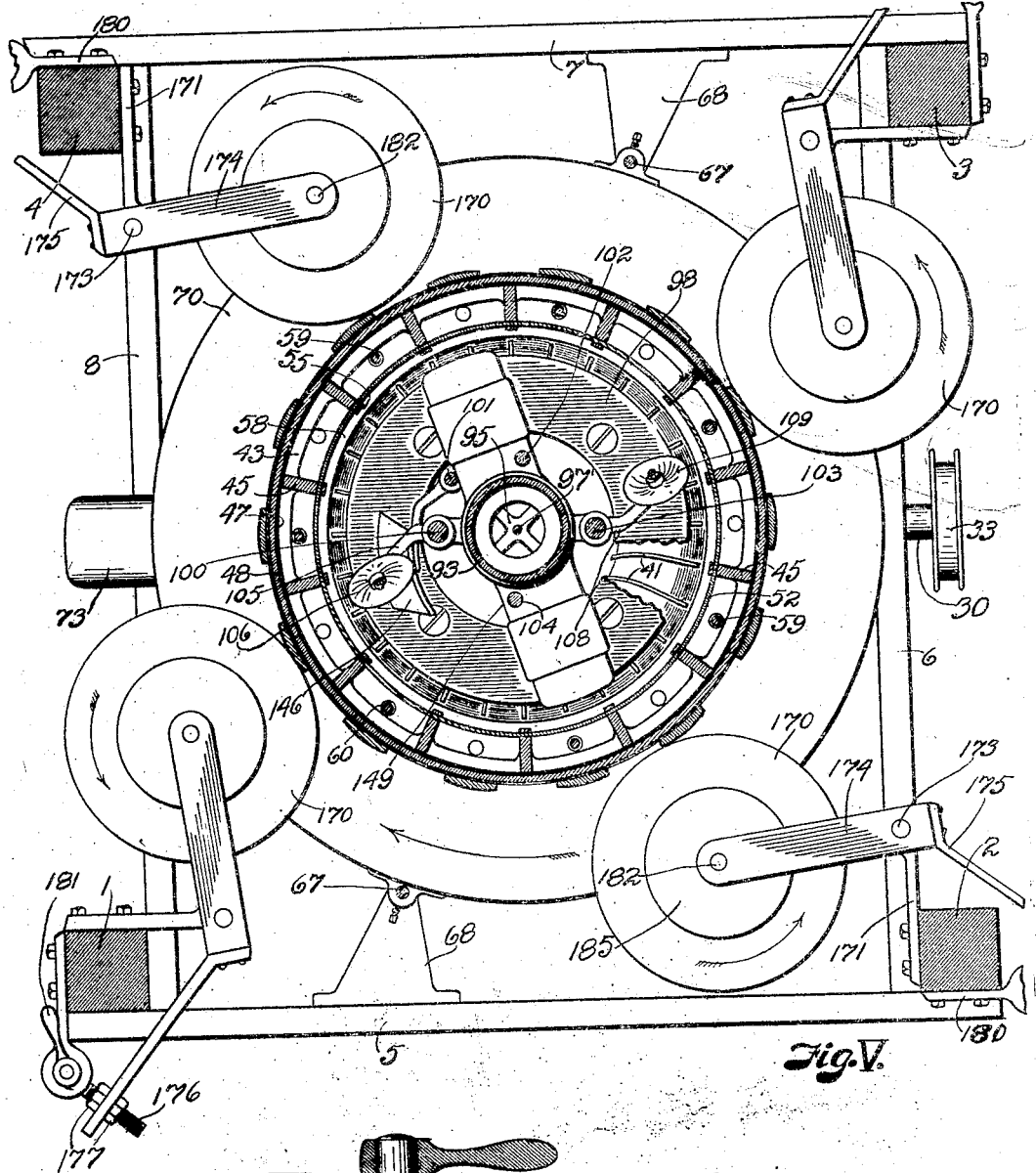
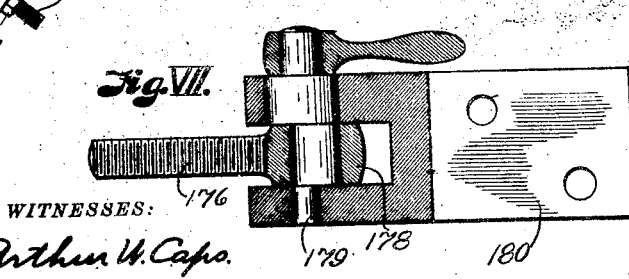

W. F. BRADBURY, DEC'D.
E. BRADBURY, ADMINISTRATRIX.
ORE SEPARATOR.
APPLICATION FILED OCT. 31, 1910.
1,042,194.
Patented Oct. 22, 1912.
7 SHEETS—SHEET 6.
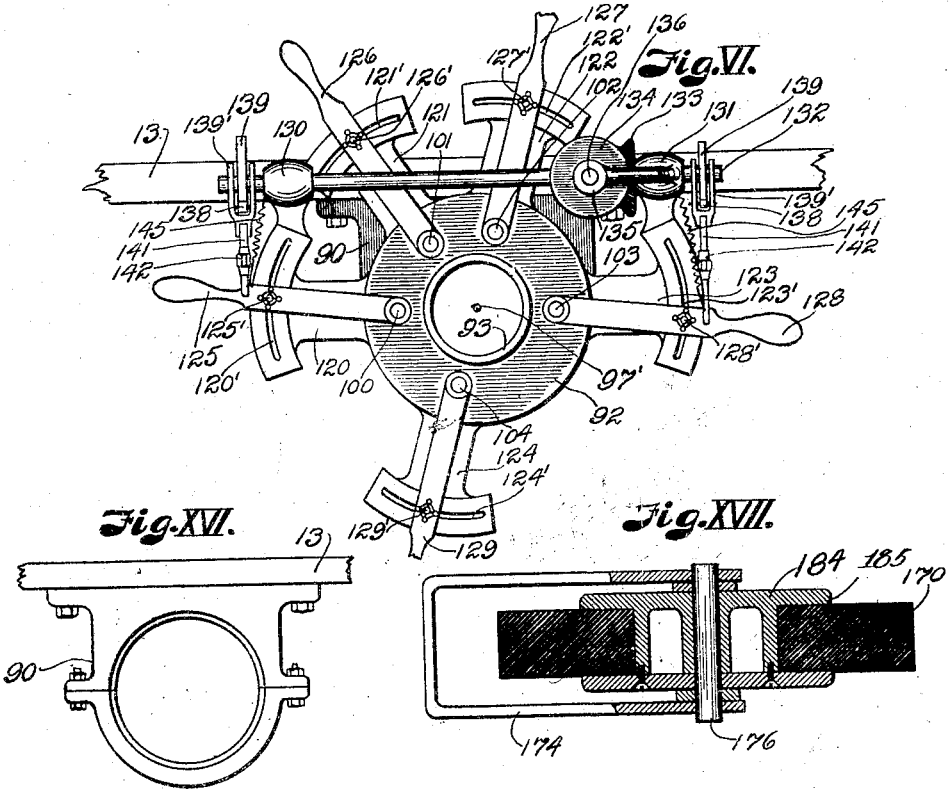
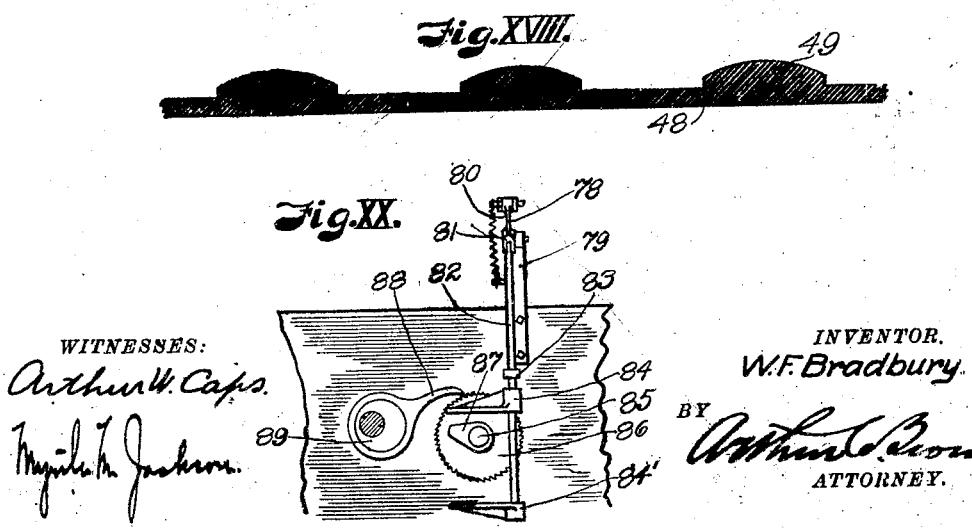
WITNESSES:
INVENTOR.
W. F. Bradbury,
BY
ATTORNEY.

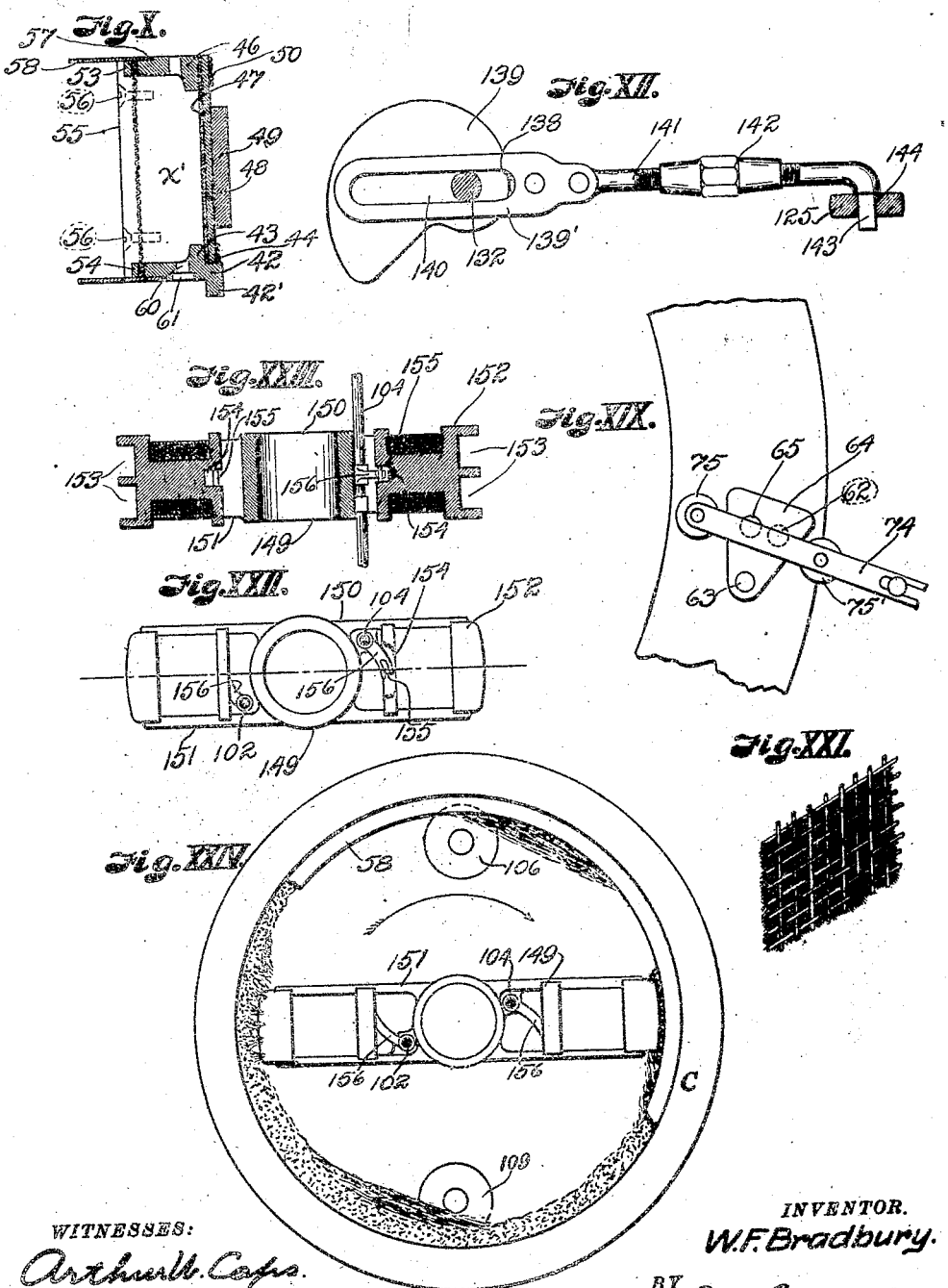

UNITED STATES PATENT OFFICE.

WILLIAM F. BRADBURY, OF KANSAS CITY, KANSAS; EMMA BRADBURY ADMINISTRATRIX OF SAID WILLIAM F. BRADBURY, DECEASED.

ORE-SEPARATOR.

1,042,194.  Specification of Letters Patent.  Patented Oct. 22, 1912.

Application filed October 31, 1910. Serial No. 589,937.

*To all whom it may concern:*

Be it known that I, WILLIAM F. BRADBURY, a citizen of the United States, residing at Kansas City, in the county of Wyandotte and State of Kansas, have invented certain new and useful Improvements in Ore-Separators; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to ore separators and more particularly to a rotary separator for saving metal from pulverized or granular ore, and has for its principal object to provide an apparatus wherein the heavier particles of metal are carried to the periphery of the separator and the waste material removed.

A further object of the invention is to provide means for vibrating parts of the apparatus to facilitate separation.

A further object is to provide elevators for carrying off the waste material.

A further object is to provide other new and improved details of structure as will hereinafter be fully described and illustrated, reference being had to the accompanying drawings, in which:—

Figure I is a perspective view of a separator constructed according to my invention. Fig. II is a plan view of same. Fig. III is an enlarged vertical section of same. Fig. IV is a similar view, showing the action of the ore when the separator is in operation. Fig. V is a horizontal section on the line V—V, Fig. III. Fig. VI is a plan view of the elevator controlling levers. Fig. VII is a detail section of one of the roller controlling levers. Fig. VIII is a vertical section through a part of one of the cylinder sections, showing the relative position of one of the elevator disks. Fig. IX is a similar view, showing another detail of disks. Fig. X is a similar view of a modified form of cylinder. Fig. XI is an enlarged section of one of the disks and its mounting. Fig. XII is an enlarged detail view of the elevator controlling mechanism. Fig. XIII is a detail view of the cylinder supporting spindle. Fig. XIV is an enlarged perspective view of the ore spreader located within the feeding drum. Fig. XV is a plan view of the spindle plug head. Fig. XVI is a detail plan view of the supporting collar for the feeding drum. Fig. XVII is a central section of one of the rollers for imparting vibration to the cylinder. Fig. XVIII is a sectional view of a modified form of the vibrator band. Fig. XIX is a bottom plan view of a part of the lower cylinder section, showing the valve mechanism. Fig. XX is a detail view of the valve actuating mechanism. Fig. XXI is a detail view of a screen construction for use as a modified form of cylinder. Fig. XXII is a plan view of the preferred form of magnet used with the apparatus. Fig. XXIII is a vertical section of same. Fig. XXIV is a diagrammatic view of the cylinder and magnet, showing the action of the magnet. Fig. XXV is a perspective view of the magnet hub.

Referring more in detail to the parts:—1, 2, 3, 4, designate upright corner posts, 5, 6, 7, 8 base cross members and 9, 10, 11, 12 upper cross members which are secured to the corner posts to form a frame within and on which the separator parts are mounted. Secured to the upper cross members 10 and 12 is a beam 13 which extends across the frame and supports certain operating levers, which will presently be described.

Fixed in the lower part of the frame is a bearing member 14, having vertically arranged registering journal bearings 15—16, within which a spindle 17, that carries the separating cylinder C, is revolubly mounted; the lower end of the spindle being preferably supported in a specially constructed bearing cup that is carried on the lower end of member 14. Depending from the bottom of member 14 is a boss 18, onto which a cup 19 is threaded and secured in place by a set screw 20. Extending through an aperture in the bottom of cup 19 is a plug 21, preferably of brass, which is provided with a head 22 that rests against the upper face of the cup bottom and has the intersecting grooves 23. On the lower end of shaft 14 is a threaded shank 24, upon which is tightly secured a hardened steel block 25 that is adapted to revolve upon head 22 of plug 21. It is apparent therefore that the whole weight of the cylinder C, its contents and appurtenances is carried by plug 21, and the cup 19 is of sufficient size to contain a quantity of oil 26, which flows through the grooves 23 of head 22 and thus constantly lubricates the thrust bearing.

On spindle 17 is a beveled gear 28 which meshes with a small bevel gear 29 on a transverse shaft 30 that is revolubly mounted in journal bearings 31 and 32 on the frame 14. Near its outer end, shaft 30 carries a pulley 33, which may be connected by a belt with any convenient source of power (not shown).

Referring now more specifically to the construction of the cylinder C, $x$—$y$—$z$ designate ring members which, with the bottom 34 and top ring member 35, form the cylinder proper, which may be made up of as many sections as may be desired; three being shown in the drawings, as that is the number which I prefer to use.

Threaded onto the upper end of spindle 17 and supported on a collar 36 on said spindle, is the cylinder bottom 34; this bottom member comprising a central cone member 37, a horizontal body ring 38, and an upwardly and outwardly inclined rim member 39, having the horizontal flange 40, the latter being on a level with the apex of the cone member 37. Fixed on the horizontal body ring 38 are turbine blades 41, the major portions of which are radial, while their inner ends are curved slightly forwardly in the direction of revolution of the cylinder.

Supported on the outer bottom flange 40, is a chambered ring $x$, comprising a base 42 having a flange 42′ depending over the outer edge of flange 40, and an upturned flange 43 which is set in from the outer edge of the base to form a shoulder 44. Spaced at regular intervals around the periphery of the cylinder are partitions 45, which support the upper ring member 46.

Seated in the shoulder of the base member 42 and bearing against the outer face of the upper member 46 is a band 47, of rubber or other elastic material, and superimposed on said band 47 is a heavier band 48 of canvas-rubber belting, or the like. On the outer face of the band 48, near the center of the spaces marked by the partitions 45 and upper and lower ring members 42—46, are the blocks or bosses 49. It is apparent that the inner and outer bands 47—48 and bosses 49 may be made integral, as illustrated in Fig. XVIII. These bands are held in place by wires 50 which are wound around both the top and bottom of each band and hold same tightly against the rings 42—46 and form water tight joints therebetween.

Abutting against the inner faces of rings 42—46 is a strip of felt 52, which is secured at the top and bottom by metal rings 53—54 and to the vertical partitions 45 by bars 55; and said bars being attached to the partition 45 by screws 56.

The upper ring 46 has a small recess 57 in its under face within which a thin flat ring 58 is seated and held in position by the base ring 42 of the upper cylinder section $y$, said ring 58 being projected inward a short distance to form a shelf or riffle. Having built up one or more of these cylinder sections $x$—$y$ etc., on the cylinder bottom 34, the top cover member 35 is placed on top of the cylinder and secured by bolts 59 which pass down through registering apertures 60 in the rings 42—46, the bolts being extended through alternate chambers to leave the apertures in alternate chambers open. These apertures 60 are preferably about 1/32″ larger than the bolts 59 and are located near the center of each of the pockets $x'$, the apertures in the ring 42 being in communication with an annular peripheral groove 61 which extends around the bottom of each of the lower rings 42.

On the horizontal flange 40 of the cylinder bottom 34, are valve ports 62 which communicate with the groove 61 of the ring 42 of the lower cylinder section. Pivoted to the under face of flange 40 by pins 63, are plates 64, each of which has an aperture 65 that is adapted for registration or non-registration with the flange port 62 according to the position of the plate, to control the outflow of water from the separate pockets $x'$.

Suspended beneath the cylinder by the vertical rods 67, which are carried by brackets 68 on the main frame, is a stationary receiving chamber R, comprising a circular trough having a central collar 71 surrounding and spaced from the spindle 17, and the cover having a central opening 72 of sufficient diameter to produce plenty of clearance when the cylinder is in motion. Opening from the lower portion of the trough is a spout 73 for discharging into a suitable flume (not shown).

In order to operate the valve plates 64 which, it will be understood, revolve with the cylinder, I provide a bar 74, which is slidably mounted in a slot 74′ in the cover 70 of the receiving chamber and has rollers 75—75′, adapted for engagement with the tapering sides of plate 64, and a handle portion 76 on its free outer end. It is apparent, therefore, that when the cylinder is revolving, should the bar 74 be pulled outward, rollers 75 will engage the inside tapered edge of plate 64, and move the plate over so as to register the valve opening 65 with the port 62 in the cylinder bottom, and that when the bar is moved inward the roller 75′ will move the plate and the openings will be moved out of registration and the valves will be closed.

In order that the valve may be opened and closed at regular intervals, I provide an automatic mechanism comprising a bell crank lever 78 which is pivoted on an arm 79 on the main frame, and has one arm, 80, connected with the lever bar 74. Pivotally connected with the other arm, 81, of the bell-crank, is a rod 82, which is adapted for travel through a guide 83 on the main frame and has a pair of spaced dogs 84—84' attached thereto.

Revolubly mounted on a stub shaft 85, on the main frame, is a ratchet wheel 86, and fixed to one face of said ratchet is an arm 87, which is adapted for revolution with the ratchet and for alternately engaging the inner faces of the dogs 84—84' to reciprocate the rod 82 and alternately open and close the valve port 62, through the bell-crank connection. The ratchet wheel is operated by a pawl 88 that is carried by an eccentric 89 on the main shaft 30.

Fixed to the cross member 13 of the main frame is a two part collar 90, in which is revolubly mounted a ring 91, having an upper flange 92. Fitted into the ring 91 and depending into the cylinder is a tube 93, the lower end of which terminates a short distance above the conical center of the cylinder bottom. Near its lower end, the tube 93 is contracted to form a neck 94, the inner face of which is screw threaded. Located within the lower portion of the tube, is a spreader 95, having blades 95' on its upper end having threaded connection with the tube neck, whereby the spreader is supported. The lower end of the spreader is cylindrical and has a socket 96 into which the tip of the upper end of the spindle 17 is projected. Surrounding the cylindrical portion 96 is a truncated cone member 97, which is adapted for spreading crushed or pulverized ore delivered through the tube, so that it is delivered evenly from the lower end of the tube and beneath a flat ring 98 that is mounted on and partly covers the turbine blades 41; this spreader also serves to protect the bearing of spreader cylinder 95 from the ore. Extending through the shank of the spreader 95 is a small tube 97' which is adapted for delivering lubricant into the socket 96 from an oil cup 98' on its upper end, to lubricate the bearing on the upper end of the spindle.

Revolubly mounted in the ring 91 and in bearings 99 on the tube 93 are vertical rods 100, 101, 102, 103 and 104. Fixed on rod 100 are arms 105, which are curved upwardly and laterally and have concaved disks 106 revolubly mounted on their ends, so that the cutting edges of the disks are tangent to horizontal planes of the arms. These disks are arranged in pairs, and each pair is adapted for operation in the lower two thirds of one of the cylinder sections.

Rigidly mounted on rod 103 are arms 108, similar to arms 105. At the ends of arms 108 are revolubly mounted the concave elevating disks 109, which are of greater curvature than the elevating disks 106 and are also placed so that their cutting edge is tangent to the horizontal plane of the arms; the elevating disks on this rod being adapted to operate in the upper one third of each cylinder section, just beneath the riffle 58. As the elevating disks 106 and 109 and their mountings are identical, except for the difference in curvature, the detailed description of one will suffice for both.

Tightly screwed into the end of arm 105 (Fig. XI), is a stub shaft 110, having an annular collar 111, which bears against the face of the arm; the outer end of said shaft having threads 112. Revolubly mounted on shaft 110 is a hub 113 having a head portion 114 resting on collar 111, and a central body portion 115 having exterior threads, and an end portion 116 of slightly less diameter than the body.

Around the body portion 115 and resting against head 114 is the disk 106 which is clamped to the head 114 by a nut 115' that is threaded onto body 113. Threaded onto the end of shaft 110 is a nut 116', having an annular cup shaped end which is adapted to fit over the contracted end of body 113 to protect the bearing from sand and grit. I also prefer to provide a cotter pin 117 for holding the nut 116' in position.

Integral with and projecting outwardly from ring 91 are the quadrant members 120—121—122—123 and 124, having curved slots 120'—121'—122'—123' and 124' in the outer ends. Fixed to the vertical rods 100—101—102—103 and 104 and extending outwardly over the quadrants, are the levers 125—126—127—128 and 129, having screws 125'—126'—127'—128' and 129' extended through the quadrant slots and adapted for holding the levers in adjusted position.

Integral with the two diametrically opposite quadrants 120 and 122, are the journal bearings 130 and 131 in which a shaft 132 is revolubly mounted. Rigidly fixed on shaft 132 is a bevel gear 133 which meshes with a bevel gear 134, revolubly mounted in a bearing 135 and connected with a flexible shaft 136 that may derive its power from any suitable source, such as a counter shaft, or motor (not shown).

Rigidly mounted on each end of shaft 132 is a cam 139 (Fig. XII), which is adapted to operate against rollers 138 in a forked member 139', each bifurcated end of which is slotted at 140 to receive the shaft. Pivoted to the opposite end of the member 139' is a connecting rod 141 having a turnbuckle 142 and a downturned end 143 which is projected through an opening 144 of lever 125 or 128. Springs 145 connect the levers 125 and 128 with a stationary part and yieldingly hold rollers 138 against cams 139.

It is obvious that through the agency of the cams 139 the disks 106 and 109 are made to move outwardly, slowly and gradually to their maximum position and are then brought sharply back to the minimum position.

On the lower end of rod 101 is rigidly secured a shoe 146 which is adapted to set very close to plate 98 and may be oscillated, when desired, by operating the hand lever 126. The object of this shoe is to elevate any coarse particles which may collect in the bottom of the cylinder C, so that they may be thrown against the cylinder below the first elevating disk by centrifugal force.

In addition to the mechanical influences, which I have described and enumerated, I introduce electro-magnetic forces as an aid to the separation, such forces being obtained from the electro-magnets 149 which are located on and project diametrically outward from the central tube 93, one magnet being preferably located in each of the sections $x$—$y$—$z$. Each of these magnets preferably comprises a body member 150, having the guide members 151 in which are slidably mounted the electro-magnets 152, whose outer faces have horizontal slots 153, so as not to obstruct the water during operation of the separator. At the rear of each magnet are the slots 154 having pins 155 extended across their mouths which are actuated by levers 156 on the vertical rods 102 and 104. These magnets are adapted to be moved toward and from the surface of the cylinder by levers 127 and 129 respectively, to regulate the strength of the magnet forces.

It should be understood that the intrinsic purpose of the electro-magnets is not to pick up and eliminate those waste particles in the ore upon which magnetic influence is exerted, nor to eliminate those particles only which adhere to the electro-magnets, but to draw these magnetic particles to the surface of the mass and in a position where they can be carried away mechanically in the water as a slush by the elevating disks.

On the top member 35 on the upper cylinder section, is an outwardly turned flange 160, upon which is hung a hopper 161, the body of which is inclined downwardly and has a lip 162 depending over the inner edge of the top member 35. On the outer edge of the hopper is a flange 163 which depends some little distance below the edge of the flange 160.

Carried on the rods 67 is a receiving chamber 164, the inner side of which rises between the top member 35, of the cylinder, and the depending flange 163, of the hopper in order to obviate splashing when the waste is delivered to the chamber. On chamber 164 is a lid 165 which extends over the sides of the cylinder and has a central opening 166 through which the feed tube is projected. On the edge of the lid is a flange 167 which extends into the interior of the chamber 164. I also provide the receiving chamber with a spout 168, through which waste may be drained off.

To impart vibrating impulses to the cylinder chambers, I provide a series of disks 170, which are adapted to engage the bosses 49 on the outer coverings of the cylinder pockets when the cylinder is revolved, which disks are mounted and constructed as follows:—Upon each of the frame posts 1, 2, 3 and 4, in a plane with one set of bosses 49, is fixed a bracket 171, having a boss 172 at its free end. In boss 172 is mounted a shaft 173, upon which is pivotally mounted a U-shaped frame 174. At the rear of this frame is rigidly mounted a lever 175 which extends backward at an angle and has a bolt 176 projected therethrough, said bolt 176 having lock nuts 177 on each side of the lever to hold same in an adjusted position. On the other end of bolt 176 is a boss 178 that is pivotally mounted on an eccentric shaft 179 which is, in turn, revolubly mounted in an arm 180 rigidly secured to the frame post 1 and extends laterally therefrom. The eccentric shaft has a hand lever 181 rigidly mounted on its upper end for rocking the frame 174 on its pivotal mounting. Between the bifurcated members of said frames 174 are shafts 182, upon which the disks 170 are revolubly mounted. Each of these disks comprises a hub member 184 having flanges 185 between which the disk 170 is clamped. The disks are preferably formed of rubber to provide better engaging surfaces, and one of the flanges of each hub is preferably removable in order that the disk may be inserted. Said disks are adapted to bear against the bosses of the cylinder C in the position illustrated, it being obvious that the disks may be adjusted to the tension desired by means of the nuts 177, while they may be thrown out of engagement with said bosses by operating lever 181 to reverse the eccentric shaft 179. On the top of tube 93 is a hopper 190, having a mesh diaphragm 190', for excluding coarse material, and delivering into said hopper is a pipe 191 having a hopper 192 into which crushed ore may be poured to be delivered with water through the pipe into the main hopper.

In using the separator, power is applied to the drive shaft and the cylinder revolved with the supporting spindle, the block bearing revolving on the plug head within the oil in the bearing cup and affording a smooth, cool bearing. During the revolution of the cylinder, water is delivered through the feed pipe, and crushed ore or metal bearing sand is fed into said pipe through the hopper, so that the ore and water is delivered together through the cylinder hopper into the feed tube, the screen in the hopper keeping back particles of ore which are sufficiently large to clog the lower end of the tube or the turbine blades.

The pulverized ore, mixed with water, falls through the lower end of the tube until it strikes the truncated cone shaped spreader 97 which in turn discharges it upon the cone shaped portion 37 of the swiftly revolving cylinder. The mixture of ore and water is then carried outward by centrifugal force and engages the turbine blades 41, whose curved inner ends tend to increase the velocity of the particles. After leaving these blades the mixture strikes the outwardly inclined edge 39 of the cylinder bottom and is thrown upwardly against the felt covering 52 of pockets $x'$ in the lowest cylinder section $x$, the weight of the ore causing it to drag on the felt surface, so that the particles are agitated while being thrown outwardly by centrifugal force, so that the metal particles may separate from the lighter waste particles.

As felt is a porous substance, water will flow therethrough and into the pockets $x'$, until these pockets are filled, when the centrifugal force of the rapidly moving cylinder C will have a tendency to settle the ore particles against the sides of the cylinder, leaving the surplus water and lighter constituents of the ore toward the center. Ore and water having been fed into the cylinder until the ore has formed a layer around the inside of the lower cylinder section to a depth slightly less than the projection of the riffle 58, the elevating disks begin to perform their function.

The two slightly concave shaped disks 106 engage the surface material first, throwing it upward to be again deposited against the cylinder side and caught by the more concave shaped disk 109 which operates just under the riffle in the lower cylinder section and be deposited, by this disk, against the felt of the next higher cylinder section $y$. The same action continues in this section and the material is passed on to section $z$, where it is again subjected to the same treatment, the elevation continuing through as many sections as there may be in the complete cylinder.

It is obvious that in metal bearing ores, the metal, being the heavier of the particles in the mass, will collect on the felt and that the surplus and waste material will be lifted, together with the water, leaving the pure metal on the bottom of the cylinder and on the riffles 58. In case a clog should occur in the bottom or lower corner, the shoe 146 starts the fluid mass upward and the action continues.

During the agitating and elevating operation just described, the magnets 149 are acting on the magnetically influenced particles of the ore to hold same toward the center of the cylinder, so that the non-magnetic particles may move freely toward the outside of the cylinder, it being understood that the purpose of providing the magnets is not to accomplish the separation wholly by this means, but to aid in the agitation of the ore particles and thereby assist the travel of the particles of ore to be saved, toward the outside. It is apparent that the magnets may be moved inward or outward to regulate the force to be applied to the ore particles.

During the revolution of the cylinder, the bosses 49 are successively engaged by the disks 170, so that a pounding action is produced against the flexible outer covering of the pockets $x'$, which pounding action or vibration is transmitted through the water in the chambers and through the felt 52, into the mass of ore, so that minute sprays are dashed into the mass of ore particles, serving to separate and agitate the particles to better enable the particles of metal it is desired to save, to force their way outwardly to the cylinder surface.

In some cases it may be desirable to use a screen, as shown in Fig. XXI, in place of the felt partition 52, when I prefer to use a very coarse mesh wire screen having a fine close mesh metal screen soldered at intervals to the insersection of the coarser mesh strands. With this method, the heavier particles of the metal will be forced through the screen and into the pocket $x'$. These pockets will then have to be drained at regular intervals as previously described.

As has been formerly described, the pockets $x'$ each have connection with an annular peripheral groove 61 in the bottom ring 42 of each cylinder section, the lowest groove communicating with the valve ports 62, which, when closed, retain the whole bulk of water in all of the pockets, but when open allow the water and solid matter, which may have passed through the felt, to flow into the circular receiving chamber R, from which it may be conducted to a suitable settling basin.

Having thus described my invention, what I claim as new therein and desire to secure by Letters-Patent is:—

1. In a separator, a revoluble cylinder, having an impervious flexible outer wall and a pervious inner wall spaced from the outer wall, means for feeding material to the interior of the cylinder, and means for vibrating the outer wall.

2. In a separator, a revoluble cylinder having an impervious flexible outer wall, a pervious wall spaced inwardly therefrom, the annulus between the walls having communication with the interior of the cylinder only through the pervious wall, means for feeding material to the interior of the advantags of the construction and of the wall.

3. In a separator, a suitable frame, a revoluble cylinder, having a flexible, impervious outer wall, bosses on its outer face, a pervious wall spaced inwardly from the outer wall and entirely inclosing the annulus formed by said walls, and revoluble disks rigidly mounted on the frame and adapted for rolling engagement with the outer wall of the cylinder and with said bosses.

4. In a separator, a rotary cylinder, rods located in said cylinder, agitators on said rods, levers fixed to said rods, stationary quadrant members having slots, and screws connecting the levers with the quadrant members to act as guides and for fixing said levers in an adjusted position.

5. In a separator, a rotary cylinder, a rod located in said cylinder and adapted for rotary movement, agitators on said rod, a lever fixed to said rod, a revoluble shaft, a bifurcated rod having slotted members slidable on said rod, and a cam fixed to the shaft between said bifurcated members and adapted for actuating said rod, for the purpose set forth.

6. In a separator, a rotary cylinder, rods located in said cylinder and adapted for rotary movement, agitators on said rods, levers fixed on said rods, stationary quadrant members having slots, screws extending through said levers and said quadrant slots, a revoluble shaft, rods connected with said levers and having bifurcated members slidable on said shaft and provided with rollers at the bases of the bifurcated portions, and cams fixed on said shaft between the bifurcated members of said rods and adapted for engaging said rollers to reciprocate the rods, substantially as and for the purpose set forth.

7. In a separator, the combination with a centrifugal concentrating cylinder, of a tube located in said cylinder and having a bottom port, and magnets carried by said tube and extending radially therefrom and adapted to partially counteract the effect of centrifugal force upon the paramagnetic material.

8. In a separator, a cylinder comprising a bottom member having a conical central part and a raised outer rim, the inner edge of said rim being inclined, blades supported on said body ring and having forwardly curved inner ends, and a horizontal ring supported on the inner ends of said blades and exposing mouths at the outer ends of the blades, substantially as set forth.

9. In a separator, a rotary cylinder comprising a bottom member having a conical central part and a raised outer rim, blades supported on the bottom member, between the conical center and rim and having forwardly curved inner ends, a ring supported on said blades, and a tube depending into said cylinder and having a bottom port adapted for delivering material onto the conical part of said cylinder bottom.

10. In a separator, a cylinder comprising an inner shell and an outer flexible shell, the shells being spaced apart to provide an annulus therebetween, means for feeding material and liquid to the inner shell and means exterior to the cylinder for imparting vibrations to the outer shell, said inner shell being porous to pass liquid therethrough into the annulus between the shells whereby vibration on the outer shell may be transmitted directly to the liquid, for the purpose set forth.

11. In a separator, a cylinder comprising inner and outer shells, the inner shell being porous and flexible and the outer shell being water tight and flexible, bosses on the outer face of the outer shell, rollers adapted for engagement with said bosses, and means for rotating said cylinder.

12. In a separator, a cylinder having water chambers in its periphery, the inner walls of said chambers being porous and flexible and the outer walls being water tight and flexible, bosses on the outer faces of said outer walls, rollers adapted for engagement with said bosses, and means for rotating said cylinder.

13. In a separator, a cylinder comprising a bottom member having apertures therein, a ring supported on said bottom member and having a groove in its inner face communicating with the apertures in the bottom member and having apertures opening through its upper portion and into said groove, an upper ring member, a porous wall fixed to the inner faces of said ring members, a water tight, but flexible wall fixed to the outer faces of said ring members, and means for hammering said outer wall to force liquid from the chamber, formed by said walls, through the porous inner wall, for the purpose of creating jets, substantially as set forth.

14. In a separator, a cylinder formed in sections, each section comprising base and top rings, and inner and outer walls attached to said rings, both walls being flexible and the inner wall being porous, riffle plates extending inwardly at the joints of the sections, said bottom rings having ports for draining off liquid, and a trough supported beneath the cylinder and adapted for receiving said liquid.

15. In a separator, a rotary cylinder, a tube extending through the center of the cylinder and adapted for delivering ore to the bottom thereof, means for beating the periphery of the cylinder to agitate the ore therein, and a magnet carried by said tube and adapted to partially counteract the effect of centrifugal force upon the paramagnetic material, for the purpose set forth.

16. In a separator, a rotary cylinder, a tube extending through the center of the cylinder and adapted for delivering ore to the bottom thereof, means for beating the periphery of the cylinder to agitate the ore therein, and a magnet carried by the tube and extending radially therefrom and adapted to partially counteract the effect of centrifugal force upon the paramagnetic material, for the purpose set forth.

17. In a separator, a rotary cylinder, a tube extending through the center of the cylinder and adapted for delivering ore to the bottom thereof, means for beating the periphery of the cylinder to agitate the ore therein, a magnet carried by said tube and adapted to partially counteract the effect of centrifugal force upon the paramagnetic material, and means for adjusting said magnet radially, for the purpose set forth.

In testimony whereof I affix my signature in presence of two witnesses.

WILLIAM F. BRADBURY.

Witnesses:
MYRTLE M. JACKSON,
ARTHUR W. CAPS.